April 3, 1934.  R. H. ROSE  1,953,568
TRANSMISSION MECHANISM
Filed March 30, 1933  3 Sheets-Sheet 1

Inventor
Raymond H. Rose
by Mawhinney & Mawhinney
Attorneys.

Inventor
Raymond H. Rose
by Mawhinney & Mawhinney
Attorneys.

Inventor
Raymond H. Rose
by Mawhinney & Mawhinney
Attorneys.

Patented Apr. 3, 1934

1,953,568

UNITED STATES PATENT OFFICE 1,953,568

TRANSMISSION MECHANISM

Raymond Hugh Rose, Wolverhampton, England

Application March 30, 1933, Serial No. 663,630
In Great Britain November 3, 1931

4 Claims. (Cl. 192—87)

This invention relates to change-speed gear mechanism, chiefly for use on motor-vehicles, of the kind where the different gear ratios are introduced by the operation of clutches actuated by pressure-responsive means, the supply of fluid under pressure to which is selectively controlled by valve means.

It has for its main object to adapt this principle, so as to provide for a quick and silent change of gear ratio, to gear-boxes of the type having co-axial driving and driven shafts and a constantly-driven parallel layshaft.

One particular object of the invention therefore consists in a change-speed mechanism with co-axial driving and driven shafts, the former being constantly connected to a parallel layshaft, and a meshing gear pair, between the driven shaft and the layshaft, of which one gear is free but can be clutched to its associated shaft by a valve-controlled hydraulic device.

A further particular object of the invention involves change-speed mechanism with co-axial driving and driven shafts and a constantly-driven parallel layshaft, a pair of meshing gears, for interconnecting the driven shaft and layshaft, one of which is free but can be selectively clutched to its associated shaft by a valve-controlled hydraulic device, and a hydraulically operated clutch for directly connecting the driving and driven shafts.

Where there are a number of meshing gear pairs, operable as aforesaid, for interconnecting the driven shaft and the layshaft, the hydraulic clutch associated with the lowest "speed" is conveniently disposed on the driven shaft beyond the adjacent end of the layshaft. Thus, it is not necessary for it to be restricted in size and it can therefore be made larger than the other clutches so as to be capable of dealing with the greater torque that it has to transmit.

According to a further and more particular object of the invention, each clutch comprises opposed conical members with between them oppositely-arranged pistons in a cylinder to which the fluid pressure can be supplied. A number of these cylinders and pistons may be arranged symmetrically around the clutch, each conical clutch member being an annulus co-axial with the associated shaft. In this case the annuli may be connected with the associated shaft through projections, on the pistons, which support them.

According to a still further object of the invention, the fluid is a lubricating oil which is also supplied to various points to be lubricated under a slight pressure.

For a fuller appreciation of these and other objects and advantages of the invention, attention should be directed to the following description in which reference is made to the accompanying drawings, wherein:—

Figure 1:
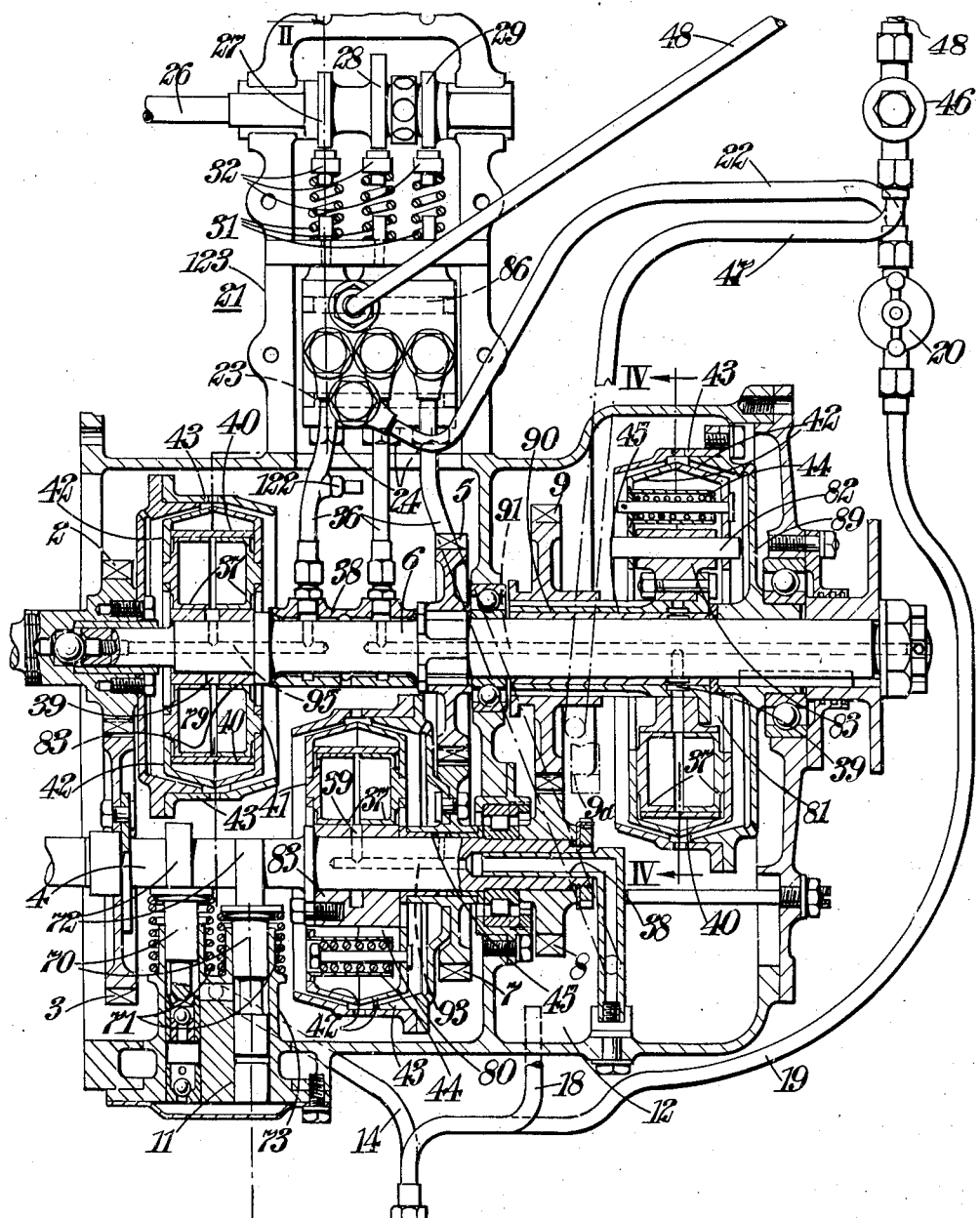
Figure 1 is a diagrammatic sectional side elevation of a three-speed gear-box adapted according to the invention, the top speed clutch being a section on the line Ia—Ia, and the middle gear or second speed clutch a section on the line Ib—Ib of Figure 2, whilst the pump is shown out of position for convenience of drawings.

In the arrangement of Figures 1, 2, 3 and 4 the flywheel or crankshaft of an internal-combustion engine is directly coupled to the gear 2 in constant mesh with the gear 3 on the layshaft 4. The second-speed gear 5 is rigidly mounted on the driven shaft 6, which spigots co-axially into the interior of the driving gear 2, and is in constant mesh with the gear 7 which is loosely mounted on the layshaft 4. The low-speed gear 8 is rigidly mounted on the layshaft and meshes with the gear 9 loosely mounted on the driven shaft 6.

Figure 2:
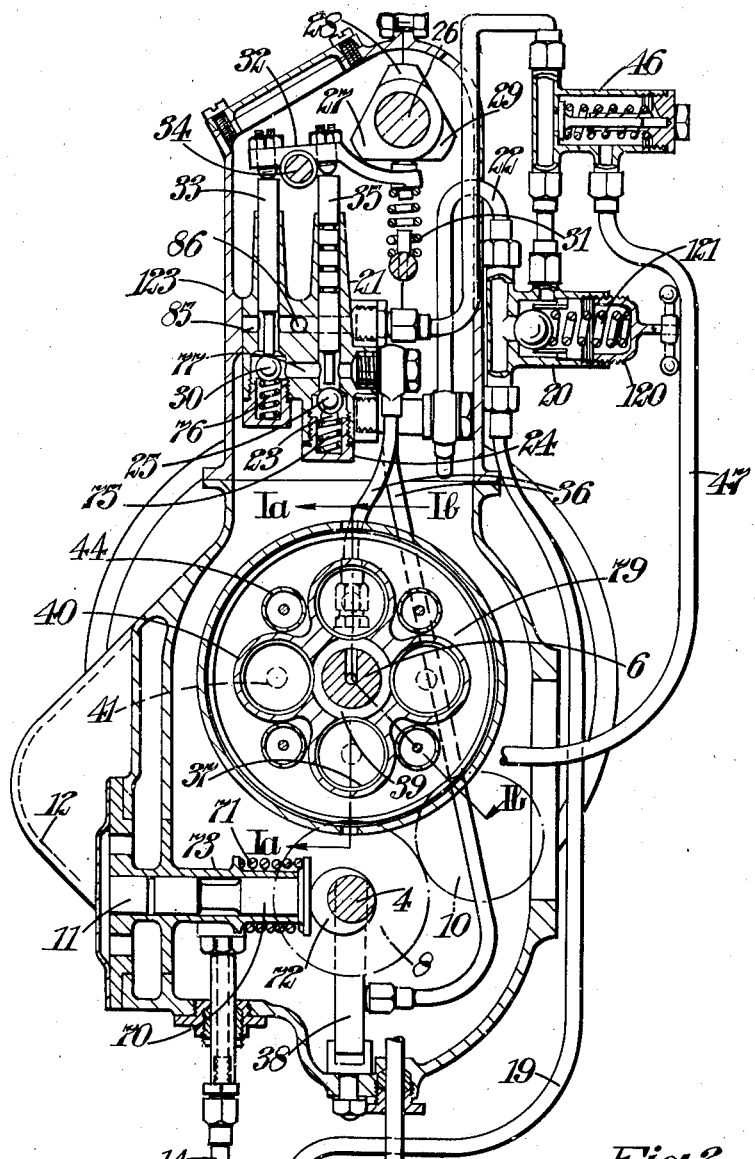
Figure 2 is a diagrammatic sectional end elevation thereof, taken mainly on the line II—II of Figure 1, with the pump in its proper position.
Figure 7:
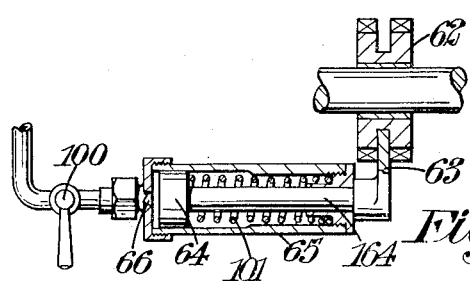
Figure 7 is a section and Figure 8 an end view of a hydraulically meshed gear, which can be applied to the arrangement of Figures 1 and 2.
Figure 8:
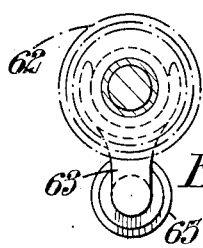

(Reverse speed is obtained by sliding by hand in the usual way, or by hydraulic means, as shown in connection with Figures 7 and 8, the gear 9 out of mesh with the gear 8—as shown by chain lines at 9a—and sliding also by the above means the gear wheel 10, shown in Figure 2, into mesh with both the gears 8 and 9. The gear wheel 10 lies stationary between wheels 7 and 8 when not in use.)

A pump, which may be of any convenient form, is shown at 11 (out of position, in Figure 1, for convenience of drawing) as consisting of two out-of-phase plungers 70, 70 biased by the springs 71 and driven by the cams 72 on the layshaft, the plungers reciprocating within casings 73. The pump draws fluid from the sump 12 in a well understood manner and delivers it to the master valve 13 by the pipe 14. The ball 15 of the master valve is held by a spring 74 to its seat, as shown in Figure 2. Actuation of the lever 16, which may be connected to the usual clutch pedal, moves a taper piece 17 to raise the ball from its seat and to give a gradual opening of the master valve around the ball 15, thus to allow the fluid to escape to the sump by the pipe 18. When the ball 15 is on its seat the valve is closed and the fluid cannot pass to the sump but flows through the pipe 19 to a main relief valve 20, which may be adjusted, to maintain a predetermined pressure, by turning the stop 120, for the spring 121, which is screwed into the casing of the valve.

Past the valve 20 it flows to the speed-control valve box 21 via the pipe 22 which is in direct communication with the passage 23 of the box. The passage 23 is in communication with the three similar valve chambers 24. Each of these chambers is sealed by an admission ball valve 25 held to its seat by the applied fluid pressure and the spring 75.

The actuating camshaft 26 has three cams, one for each speed; the low gear cam also operates the reverse. 27 is the top speed or direct gear cam; 28 is for low and reverse gears; and 29 is for the second speed. The camshaft is shown in a neutral position in which each of the three exhaust ball valves 30 is held open against the spring 76 by a spring 31 by means of a rocking lever 32 and rod 33 so as to allow any pumped oil that has previously been used to escape. There is an admission ball valve 25 and an exhaust ball valve 30 to each of the three pipes 36 which lead to the clutches, and corresponding to each pair of inlet and exhaust ball valves is a rocking lever 32.

To introduce any desired gear ratio the camshaft 26 is turned in the appropriate direction until the selected cam 27, 28 or 29 causes the associated lever 32 to swing on its pivot 34 and depress the rod 35 which moves the appropriate admission ball valve 25 from its seat; and at the same time the associated rod 33 is free to move and allow the adjacent exhaust ball valve 30 to close. Fluid can now pass along the pipe 22 and passage 23 past the selected valve 25 to the adjacent passage 77 and pipe 36, and thence it engages the appropriate clutch as described later. Each of the three passages 77 interconnects the closed side of one of the admission ball valves 25, the open side of the associated exhaust ball valve 30, and the adjacent pipe 36.

The lever 16 is a master control, however, operation of which, to the position shown by chain lines in Figure 2, releases the fluid pressure applied to the valve box 21 and thus effects a disconnection of the drive at any previously-engaged clutch.

Figure 4:
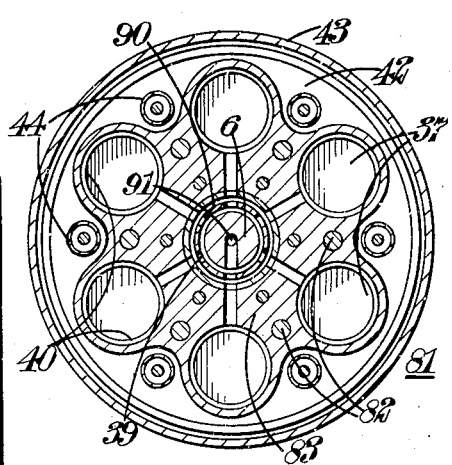
Figure 4 is a sectional elevation of the low-gear clutch thereof.

There are three clutches 79, 80 and 81 in the gear-box, each being shown as including opposed conical annuli 42 co-axial with the associated shaft and operated by a number of oppositely-arranged pistons 37 equally spaced round the shaft. On opening a valve 25 as aforesaid to engage one of the gears the fluid is admitted by means of a feed in one of the bearings 38 into a hole in the centre of the associated shaft and into the groove 39 which communicates with the cylinders 40. The pressure forces apart the conical annuli by means of the pistons 37 which are arranged in the cylinders 40 and, in the case of the clutches 79 and 80, have dowels or like-projections 41 at their ends fitting in holes in the cone-shaped annuli 42, thus centering the latter and establishing a driving connection between them and the associated shaft. When forced apart, the annuli 42 engage frictionally with the drums 43. Pull-off springs 44 are arranged to keep them free from engagement with the drums 43 when pressure does not exist in the cylinders. In the case of the clutch 81, as shown in Figure 4, which is of larger size, the pistons 37 have no dowels 41 but the drive is transmitted through the pins 82 engaging the cone-shaped annuli 42 and the block 83 in which the cylinder bores 40 are provided.

When a clutch is disengaged by closing of the associated inlet valve 25 an outlet for the fluid is provided by the opening of the appropriate exhaust valve 30 and the fluid is expelled by the pull-off springs 44 returning the pistons 37 toward each other, the expelled fluid returning by the pipe 36, the passage 77, past the exhaust valve 30 to the passage 85.

There are three passages 85, each communicating with the closed side of one of the exhaust ball valves 30, and the three passages are interconnected by the passage 86, one of them being joined to the return pipe 48.

In order to hold a slight pressure in all the pipes and cylinders so as to lubricate the bearings 38 and 45 by the fluid a resistance is created in the return pipe 48 by a low-pressure relief valve 46 through which all the fluid must pass from the main relief valve 20 before it reaches the sump 12 by final return pipe 47. The expelled fluid from the clutches flows by the pipes 48 and 47 past the valve 46 to the sump 12.

The clutch 81 for the low gear is of larger diameter than the other clutches in view of the greater torque it has to carry. It is not limited as regards its diameter by the gear shaft centres but overhangs the end of the layshaft, as shown. The clutch 79 for the direct drive carries still less torque, and in consequence a lower fluid pressure will be sufficient for holding it engaged. For this purpose the relief valve 122 is provided in the pipe 36 through which this clutch is supplied, this relief valve, which may be similar to the valve 20, being adjustable when the cover 123 of the gear-box has been removed, exhausting excess fluid into the sump.

The cones 42 and drums 43 are fixed to a gear wheel or to a shaft to suit the details of any design.

Thus, the low gear drum 43 of clutch 81 is shown as being carried by the annulus 89 keyed to the driven shaft. The block 83 carrying the cone-shaped annuli 42 of this clutch is secured to the sleeve 90 which is free on the driven shaft 6 and externally splined to receive the gear 9. For introducing low gear, i. e., when starting off the vehicle from rest, the cam-shaft 26 is turned to cause the low gear cam 28 to operate the associated rocking lever 32 and the inlet and exhaust valves, as previously described, and the fluid is supplied down the middle (Figure 1) pipe 36 to the duct 91, and thence to the pistons 37 of the clutch 81. As the cone-shaped annuli 42 engage the drum 43 the drive is taken up, from the driving gear 2, the gear 3, the lay shaft 4, the gear 8, the gear 9, the sleeve 90, the block 83 of the clutch 81, the pins 82 thereof, the annuli 42 thereof, the drum 43, and through the annulus 89 to the driven shaft 6. Whilst turning the cam-shaft 26 in this manner, the master valve 15 can be held released to prevent any other operation resulting from the temporary engagement of one of the other cams with its associated rocking lever.

In a substantially similar manner, when the cam-shaft 26 is turned to cause the second-speed cam 29 to engage its associated rocking lever 32, fluid is supplied by the right-hand (Figure 1) pipe 36 along the duct 93 in the lay shaft to operate the pistons 37 and thereby the cone-shaped annuli 42 of the clutch 80 into engagement with the drum 43 thereof. This latter is bolted to the gear 7, and, the cylinder block 83 of the clutch being bolted to the layshaft, the drive is transmitted from the latter to the driven shaft 6 by way of the pair of gears 7, 5. Similarly, when the top gear cam 27 engages its associated rocking lever 32, fluid is supplied along the left-hand (Figure 1) pipe 36 to the pistons of the clutch 79 by the duct 95. The drum 43 of this clutch is bolted to the driving gear 2, and the cylinder block 83 thereof is fast on the driven shaft.

Reverse gear follows the low gear train except that gear 10 is interposed between 8 and 9, and it is therefore engaged, after this interposition, by means of the low gear cam 28.

Figure 3:
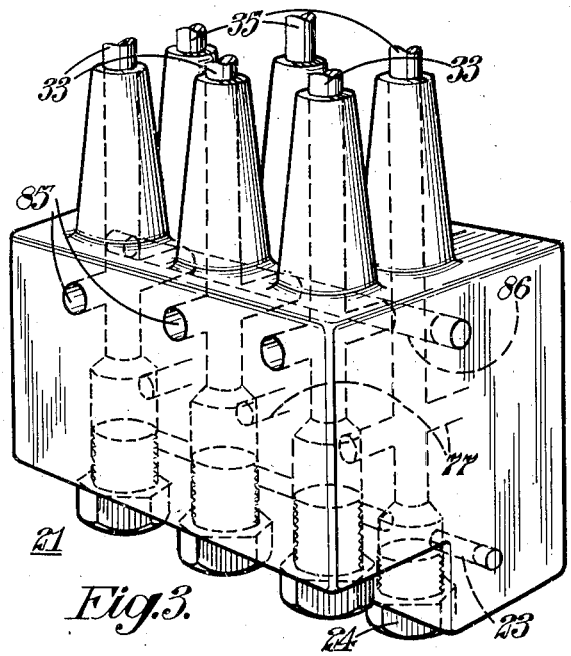
Figure 3 is a rear perspective view, to a larger scale, of the valve box thereof.
Figure 5:
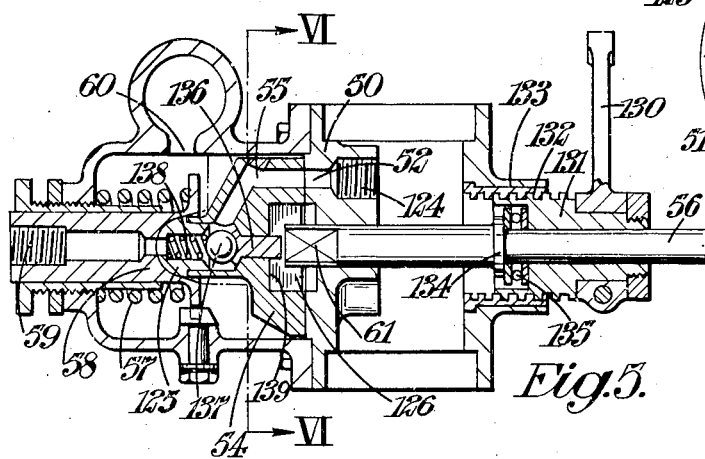
Figure 5 is a section, and Figure 6 an end elevation on the line VI—VI of Figure 5, of a rotary fluid control valve which can be used instead of that of Figures 1 and 2.
Figure 6:
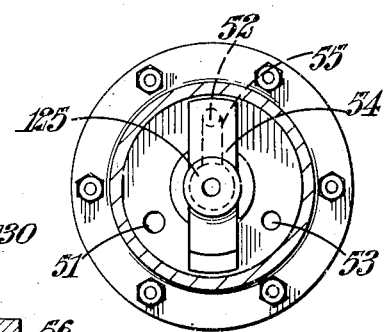

Figures 5 and 6 show a control valve which may be used in place of the valve box 21 shown in Figures 1, 2 and 3. This control valve consists of a body 50 formed with the required number of ports (in this case three) 51, 52, 53 which lead to the three pipes 36 respectively, the ends of the pipes screwing into the body at 124. A face valve 54 has a port 55 which communicates with any desired one of the ports 51, 52, 53 when the valve is rotated on the face of the body 50 by shaft 56. This valve is held to the face by means of spring 57 which presses the slidable cup seating 58 on to the ball portion 125 of the valve 54. The object of the ball and cup seating is to overcome inaccuracies in manufacture and to ensure that the face valve 54 rests flat on the body. Fluid is led in at 59 from the pipe 22 and expelled, when a clutch ceases to drive, via the outlet 60 to the pipe 48. Shaft 56 has a non-circular end 61 which slidably engages between flats 126 on the valve 54.

Furthermore, the control valve shown in Figures 5 and 6 also embodies a master control which can replace the master valve 13 of Figures 1 and 2. This master control includes the arm 130, which could conveniently be connected to the usual clutch pedal, fast on the sleeve 131. The latter has a screw-threaded engagement at 132 with the tubular portion 133 of the valve body 50, and in addition it engages a collar 134 formed on the shaft 56 through a ball thrust ring 135. Thus, rotating of the arm 130 in the appropriate direction, as by depression of the clutch pedal, will cause the shaft 56 to shift axially to the left (Figure 5) to engage the stem 136 slidably mounted in the face valve 54. Thus the ball 137 is pressed against the spring 138 against its seating to close the supply of pressure to the port 55 in the face valve. Further axial movement of the shaft 56 brings the end into engagement with the inner face 139 of the face valve and thus lifts it bodily, the cup seating 58 sliding back against the pressure of the spring 57. While the ball 137 maintains the pressure in the supply pipe lines any of the ports 51, 52, 53 that was previously aligned with the port 55 is now open to exhaust from the associated clutch past the face of the face valve into the exhaust 60. Thus, while the clutch pedal is held down a neutral gear position is obtained, but on the release of the pedal the drive will at once be taken up through the selected gear ratio. This is accomplished by shaft 56 being rotated by any appropriate means to align the ports.

Figures 7 and 8 show how a gear may be slid by hydraulic means. 62 is the gear—for example, the reverse gear—in which a striking fork 63 lies. The fork is fixed to a rod 164 having a piston 64 at its end remote from the fork. The assembly is housed in cylinder 65. Fluid is admitted at 66 by a three-way valve 100 which, in the case of the reverse gear, may open prior to the valve which admits fluid to the clutch 81 which is used in this train of gears so that the gear 62 slides into mesh before the drive is connected by that clutch. A spring 101 returns the gear after the pressure in the cylinder is destroyed on opening of the valve 100.

What I claim as my invention and desire to secure by Letters Patent of the United States is:—

1. In a change speed mechanism of the type where different gear ratios are introduced by pressure responsive means, the combination with a fluid sump, a pump, a by-pass pipe line connecting the pump with the sump, and fluid clutches, of controlling means for selectively operating the clutches, said means comprising a pipe line leading from the pump, a clutch pedal operated relief valve controlling fluid flow in the pipe line opening into the sump to return fluid thereto when the relief valve is open, a manually set selective valve device connected to the pipe line and to all of said fluid clutches and including fluid relief means for the clutches not selected, a pressure controlled return pipe line leading from the fluid relief means of the devices to the sump, and a pressure controlled relief connection between the first pipe line and the return pipe line.

2. In a change speed mechanism of the type where different gear ratios are introduced by pressure responsive means, the combination with a fluid sump, a pump, and fluid clutches, of controlling means for selectively operating the clutches, said controlling means comprising fluid pressure supply means, selectively operable connecting means between the fluid pressure means and the clutches for supplying fluid under pressure to the clutches one at a time, pressure controlled fluid return means leading from said connecting means for relieving the clutches not selected when the connecting means is operated, and a pressure controlled return connection between the fluid pressure supply means and the fluid return means.

3. In a change speed mechanism of the type where different gear ratios are introduced by pressure responsive means, the combination with a fluid sump and clutches of controlling means for selectively operating the clutches, said means comprising fluid pressure supply means, fluid return means, a connecting device disposed between the pressure supply and the return means and connected to all of the clutches, said device normally venting the clutches to the return means, selectively operable elements in the device for communicating a selected clutch with the pressure supply means and closing the selected clutch to the return means, and a pressure controlled cross connection between the pressure supply and return means.

4. In a change speed mechanism of the type where different gear ratios are introduced by pressure responsive means, the combination with a fluid sump and clutches of controlling means for selectively operating the clutches, said means comprising fluid pressure supply means, a control device having a passage communicating with the pressure supply means, a return pipe line, said device having a second passage communicating with the return line, independent connections from the clutches to said device at a point between the passages, independent pairs of valves between clutch connections and the passages, and means for alternately shifting each pair of valves to establish communication between the clutches and the pressure supply means and the return pipe line.

RAYMOND HUGH ROSE.